US012772312B2

(12) United States Patent
Hanaki et al.

(10) Patent No.: US 12,772,312 B2
(45) Date of Patent: Oct. 20, 2026

(54) TERMINAL AND RADIO COMMUNICATION METHOD

(71) Applicant: NTT DOCOMO, INC., Tokyo (JP)

(72) Inventors: Akihito Hanaki, Tokyo (JP); Kouhei Harada, Tokyo (JP); Riki Okawa, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 300 days.

(21) Appl. No.: 18/294,354

(22) PCT Filed: Aug. 5, 2021

(86) PCT No.: PCT/JP2021/029206

§ 371 (c)(1),
(2) Date: Feb. 1, 2024

(87) PCT Pub. No.: WO2023/012991

PCT Pub. Date: Feb. 9, 2023

(65) Prior Publication Data

US 2024/0292477 A1 Aug. 29, 2024

(51) Int. Cl.

| | |
|---|---|
| ***H04W 76/15*** | (2018.01) |
| ***H04W 74/0833*** | (2024.01) |
| ***H04W 76/20*** | (2018.01) |
| ***H04W 76/30*** | (2018.01) |
| *H04L 5/00* | (2006.01) |

(52) U.S. Cl.

CPC ....... *H04W 76/15* (2018.02); *H04W 74/0833* (2013.01); *H04W 76/20* (2018.02); *H04W 76/30* (2018.02); *H04L 5/0098* (2013.01)

(58) Field of Classification Search

CPC ..... H04W 76/00; H04W 76/10; H04W 76/15; H04W 74/00; H04W 74/08; H04W 74/0833; H04W 74/0836; H04W 76/20; H04W 76/25; H04W 76/27; H04W 76/30; H04W 76/34; H04L 5/0098; H04L 49/25; H04L 12/413

See application file for complete search history.

(56) References Cited

U.S. PATENT DOCUMENTS

| | | | | |
|---|---|---|---|---|
| 12,206,621 | B2 * | 1/2025 | Dinan | H04L 5/0007 |
| 12,520,358 | B2 * | 1/2026 | Cheng | H04W 76/15 |
| 2020/0022215 | A1 * | 1/2020 | Takahashi | H04W 76/19 |
| 2022/0030659 | A1 * | 1/2022 | Kim | H04W 28/06 |

(Continued)

FOREIGN PATENT DOCUMENTS

| | | | | |
|---|---|---|---|---|
| WO | WO-2022201475 A1 * | 9/2022 | | H04W 52/02 |
| WO | WO-2022201476 A1 * | 9/2022 | | H04W 72/04 |

OTHER PUBLICATIONS

Huawei; "Further Multi-RAT Dual-Connectivity enhancements"; 3GPP TSG RAN meeting #92e, RP-211362; Electronic Meeting; Jun. 14-18, 2021 (26 pages).

International Search Report issued in corresponding International Application No. PCT/JP2021/029206, mailed on Mar. 8, 2022 (3 pages).

(Continued)

*Primary Examiner* — Warner Wong

(74) *Attorney, Agent, or Firm* — Osha Bergman Watanabe & Burton LLP

(57) ABSTRACT

A terminal includes a control unit that releases a resource of a secondary cell group in response to deactivation of the secondary cell group, in which the control unit performs a random access procedure to the secondary cell group in response to activation of the secondary cell group.

7 Claims, 7 Drawing Sheets

(56) References Cited

U.S. PATENT DOCUMENTS

| | | | | |
|---|---|---|---|---|
| 2022/0132333 | A1* | 4/2022 | Mattam | H04L 5/0035 |
| 2023/0199686 | A1* | 6/2023 | Wu | H04W 56/0005 370/503 |
| 2023/0337286 | A1* | 10/2023 | Zhang | H04W 76/15 |
| 2023/0345579 | A1* | 10/2023 | Teyeb | H04W 76/34 |
| 2023/0371109 | A1* | 11/2023 | Jang | H04B 17/17 |
| 2023/0413337 | A1* | 12/2023 | Wang | H04L 5/001 |
| 2024/0031873 | A1* | 1/2024 | Da Silva | H04W 76/27 |
| 2024/0057172 | A1* | 2/2024 | Zhang | H04W 76/15 |
| 2024/0057216 | A1* | 2/2024 | Wu | H04W 76/34 |
| 2024/0147332 | A1* | 5/2024 | Zhang | H04W 36/04 |
| 2024/0196245 | A1* | 6/2024 | Kim | H04L 5/0098 |
| 2024/0223326 | A1* | 7/2024 | Zou | H04L 5/0098 |
| 2024/0237106 | A1* | 7/2024 | Agiwal | H04B 17/328 |
| 2024/0323873 | A1* | 9/2024 | Teyeb | H04W 56/0005 |
| 2025/0056639 | A1* | 2/2025 | Adjakple | H04W 8/183 |

OTHER PUBLICATIONS

Written Opinion issued in corresponding International Application No. PCT/JP2021/029206, mailed on Mar. 8, 2022 (3 pages).

MediaTek Inc.; "Signaling Procedure for Dual Connectivity"; 3GPP TSG-RAN2 #85 Meeting, R2-140196; Prague, Czech Republic; Feb. 10-14, 2014 (6 pages).

ZTE Corporation, Sanechips; "Further consideration on SCG deactivation and activation"; 3GPP TSG-RAN WG2 Meeting #113 electronic, R2-2100568; e-meeting; Jan. 25-Feb. 5, 2021 (7 pages).

Office Action issued in Japanese Patent Application No. 2023-539504, dated Sep. 4, 2025 (7 pages).

3GPP TSG-RAN WG2 Meeting #108; Tdoc R2-1916252; Ericsson, Nokia, Nokia Shanghai Bell; "Power and signalling savings at TAT expiry and reaching sr-TransMax"; Reno, U.S., Nov. 18-22, 2019 (3 pages).

3GPP TSG-RAN WG2 Meeting #114 electronic; R2-2106287; Sharp; "Discussion for UE behaviour in deactivated SCG"; Online, May 19-27, 2021 (7 pages).

* cited by examiner

TERMINAL AND RADIO COMMUNICATION METHOD

TECHNICAL FIELD

The present disclosure relates to a terminal and a radio communication method that support dual connectivity.

BACKGROUND ART

The 3rd Generation Partnership Project (3GPP) has prepared a specification for the 5th generation mobile communication system (also referred to as 5G, New Radio (NR), or Next Generation (NG)), and further a specification for a next-generation system referred to as Beyond 5G, 5G Evolution, or 6G is also being prepared.

In 3GPP Release-17, enhancement of Multi-RAT Dual Connectivity (MR-DC) is investigated, and for example, an activation/deactivation mechanism of a secondary cell group (SCG) (may be referred to as SCG activation/deactivation) is investigated with a main objective of reducing power consumption of a terminal (User Equipment, UE) (Non-Patent Literature 1).

CITATION LIST

Non-Patent Literature

Non-Patent Literature 1: "Further Multi-RAT Dual-Connectivity enhancements", RP-211362, 3GPP TSG RAN Meeting #92e, 3GPP, June 2021

SUMMARY OF THE INVENTION

Against this background, as a result of intensive investigation, the inventors and the like have found a possibility that resources (for example, Uplink (UL) resources) are occupied by a UE in which an SCG has been deactivated, and the efficiency of the use of resources is reduced.

The present invention has been made in view of such a situation, and an object of the present invention is to provide a terminal and a radio communication method capable of suppressing reduction in the efficiency of the use of the resources and suppressing delay in SCG activation.

One aspect of the present disclosure provides a terminal including: a control unit that releases a resource of a secondary cell group in response to deactivation of the secondary cell group, in which the control unit performs a random access procedure to the secondary cell group in response to activation of the secondary cell group.

One aspect of the present disclosure provides a radio communication method including: a step of releasing a resource of a secondary cell group in response to deactivation of the secondary cell group; and a step of performing a random access procedure to the secondary cell group in response to activation of the secondary cell group.

DESCRIPTION OF EMBODIMENTS

Figure 1:
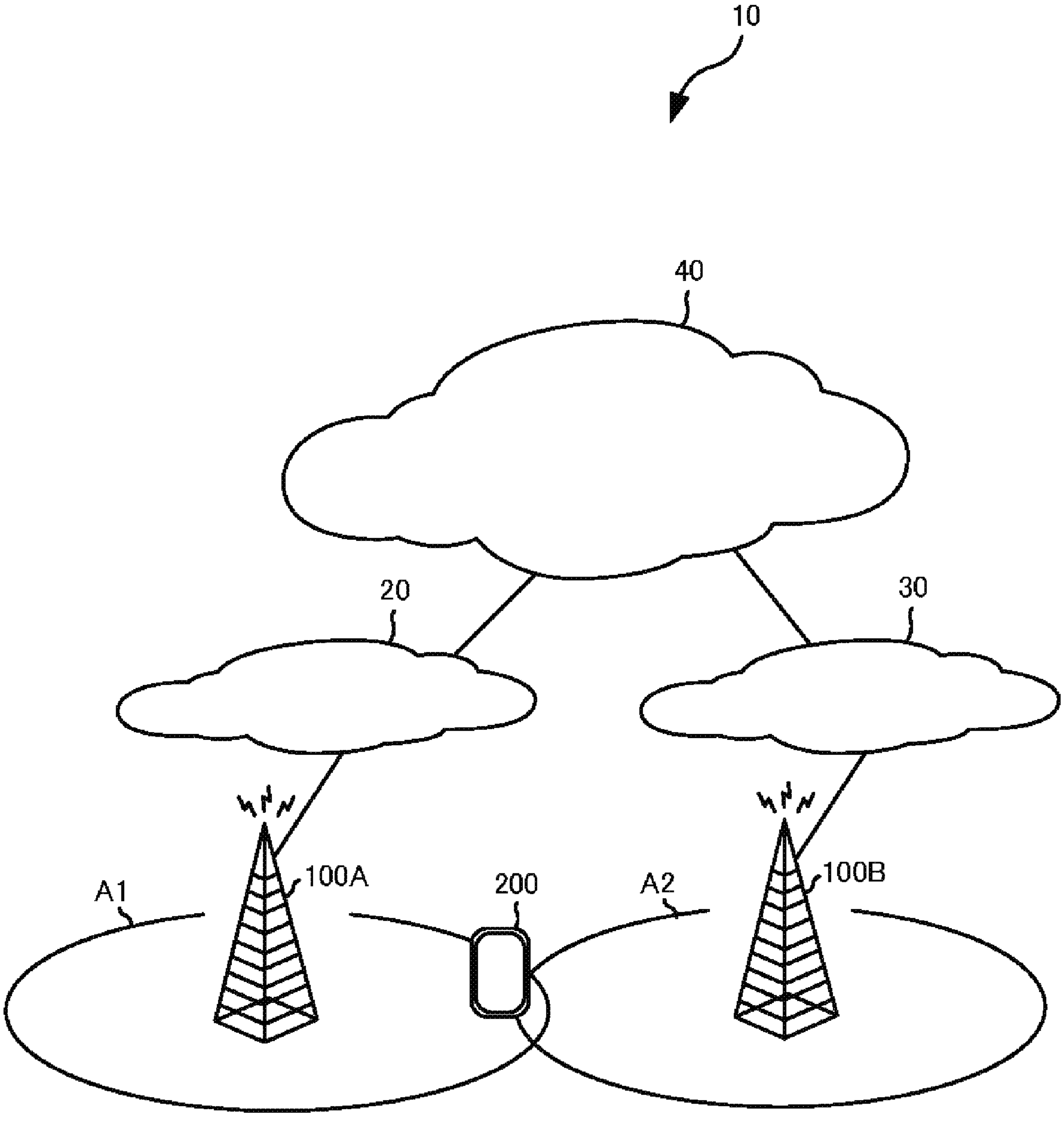
FIG. 1 is an overall schematic configuration diagram of a radio communication system 10.

Embodiments will be explained below with reference to the accompanying drawings. Note that the same or similar reference numerals have been attached to the same functions and configurations, and a description thereof will be omitted as appropriate.

EMBODIMENTS

(1) Overall Schematic Configuration of Radio Communication System

FIG. 1 is an overall schematic configuration diagram of a radio communication system 10 according to an embodiment. The radio communication system 10 is compliant with Long Term Evolution (LTE) and 5G New Radio (NR). LTE may be referred to as 4G and NR may be referred to as 5G. Further, the radio communication system 10 may be compliant with a system referred to as Beyond 5G, 5G Evolution, or 6G.

LTE and NR may be interpreted as radio access technology (RAT), and in an embodiment, LTE may be referred to as first radio access technology and NR may be referred to as second radio access technology.

The radio communication system 10 includes an Evolved Universal Terrestrial Radio Access Network 20 (hereinafter referred to as "E-UTRAN 20") and a Next Generation-Radio Access Network 30 (hereinafter referred to as "NG-RAN 30"). Further, the radio communication system 10 includes a terminal 200 (hereinafter referred to as "UE 200", user equipment).

The E-UTRAN 20 includes an eNB 100A, which is a radio base station that is compliant with LTE. The NG-RAN 30 includes a gNB 100B, which is a radio base station that is compliant with 5G (NR). Further, the NG-RAN 30 may be connected to a User Plane Function (not shown) that is included in a system architecture of 5G and provides user plane functions.

The eNB 100A and gNB 100B may be referred to as radio base stations or network devices. The E-UTRAN 20 and NG-RAN 30 (may be the eNB 100A or gNB 100B) may simply be referred to as a network.

The E-UTRAN 20 and NG-RAN 30 are connected to a core network 40. The E-UTRAN 20, NG-RAN 30, and core network 40 may simply be referred to as a network.

The core network 40 may include a first core network connected to the E-UTRAN 20. The first core network may be referred to as an Evolved Packet Core (EPC). The core network 40 may include a second core network connected to the NG-RAN 30. The second core network may be referred to as 5GC or 6GC.

In the radio communication system 10, the eNB 100A, gNB 100B, and UE 200 can support carrier aggregation (CA) using a plurality of component carriers (CCs) and dual connectivity (DC) simultaneously communicating between the UE and each of a plurality of Nodes.

The eNB 100A, gNB 100B, and UE 200 perform radio communication via a radio bearer, specifically a Signaling Radio Bearer (SRB) or DRB Data Radio Bearer (DRB).

The UE 200 may perform E-UTRA-NR Dual Connectivity (EN-DC) in which the eNB 100A constitutes a master node (MN) and the gNB 100B constitutes a secondary node (SN), for example. The UE 200 may perform NR-E-UTRA Dual Connectivity (NE-DC) in which the gNB 100B constitutes the MN and the eNB 100A constitutes the SN. The UE 200 may perform NR-NR Dual Connectivity (NR-DC) in which the gNB constitutes the MN and SN. The EN-DC, NE-DC, and NR-DC may be referred to as Multi-Radio Dual Connectivity (MR-DC).

In the DC described above, a group of cells capable of performing processing on a C-plane (control plane) and U-plane (user plane) may be referred to as a first cell group (Master Cell Group, MCG). In the DC described above, a group of cells capable of performing processing on a U-plane (user plane) may be referred to as a second cell group (Secondary Cell Group, SCG). A base station included in the MCG may be referred to as a MN, and a cell included in the MCG may be referred to as a master cell. A base station included in the SCG may be referred to as an SN, and a cell included in the SCG may be referred to as a secondary cell.

Further, in the radio communication system 10, addition/change of a Primary SCell (PSCell) (PSCell addition/change) may be supported. The PSCell addition/change may include conditional PSCell addition/change.

The PSCell is a type of secondary cell. The PSCell means the Primary SCell (secondary cell) and may be interpreted as corresponding to one of a plurality of SCells.

Figure 2:
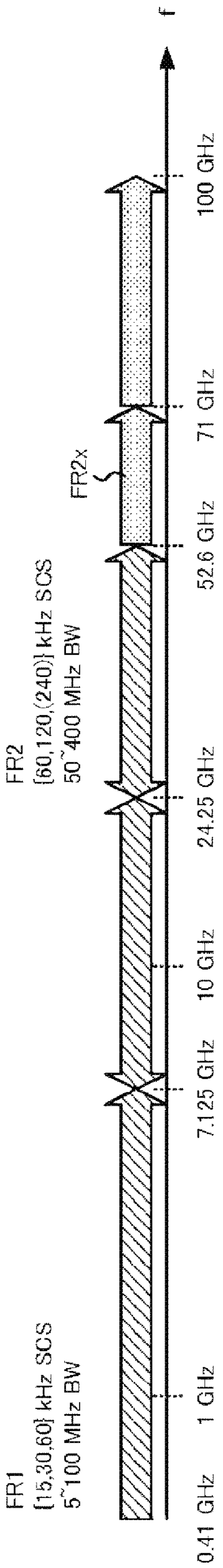
FIG. 2 is a diagram showing a frequency range used in the radio communication system 10.

Further, the radio communication system 10 supports a plurality of frequency ranges (FRs). FIG. 2 shows frequency ranges used in the radio communication system 10.

As shown in FIG. 2, the radio communication system 10 supports an FR1 and an FR2. Frequency bands of each FR are as follows.

FR1: 410 MHz to 7.125 GHz

FR2: 24.25 GHz to 52.6 GHz

In the FR1, Sub-Carrier Spacing (SCS) of 15, 30, or 60 kHz is used, and a bandwidth (BW) of 5 to 100 MHz may be used. The FR2 is higher than the FR1, an SCS of 60 or 120 kHz (240 kHz may be included) is used, and a bandwidth (BW) of 50 to 400 MHz may be used.

The SCS may be interpreted as numerology. The numerology is defined in 3GPP TS38.300 and corresponds to one sub-carrier spacing in a frequency domain.

In addition, the radio communication system 10 may support a frequency band which is higher than the frequency band of the FR2. Specifically, the radio communication system 10 supports a frequency band greater than 52.6 GHz and up to 71 GHz or 114.25 GHz. This high frequency band may be referred to as "FR2x", for convenience.

To solve a problem that an influence of phase noise increases in a high frequency band, when a band greater than 52.6 GHz is used, Cyclic Prefix-Orthogonal Frequency Division Multiplexing (CP-OFDM)/Discrete Fourier Transform-Spread (DFT-S-OFDM) with greater Sub-Carrier Spacing (SCS) may be applied.

Figure 3:
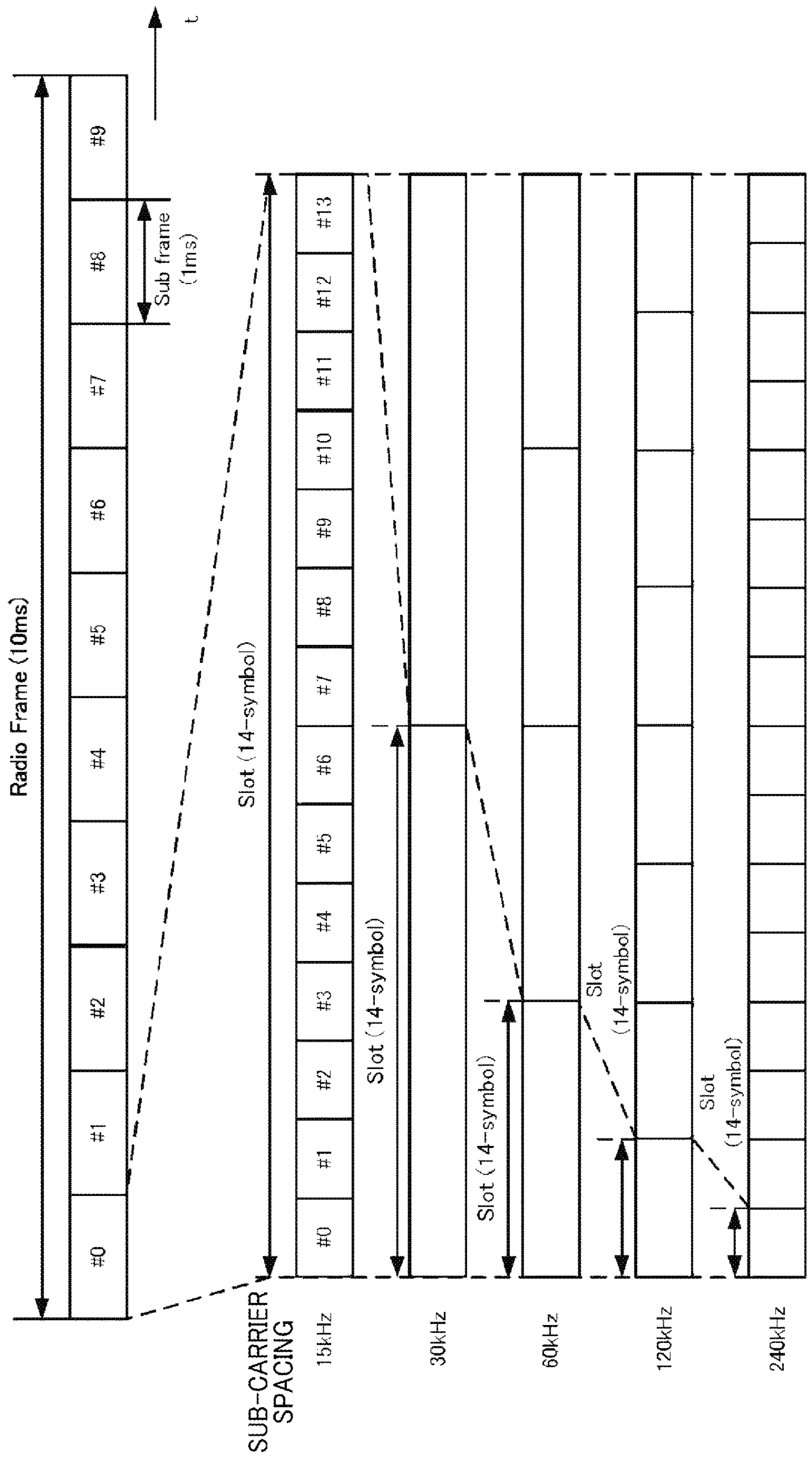
FIG. 3 is a diagram showing configuration examples of radio frames, subframes, and slots used in the radio communication system 10.

FIG. 3 is a diagram showing configuration examples of radio frames, subframes and slots used in the radio communication system 10.

As shown in FIG. 3, 14 symbols constitute one slot, and the greater (wider) the SCS, the shorter the symbol period (and the slot period). The SCS is not limited to an interval (frequency) shown in FIG. 3. For example, 480 kHz, 960 kHz, or the like may be used.

The number of symbols constituting one slot does not necessarily have to be 14 (for example, 28, 56 symbols). In addition, the number of slots per subframe may vary depending on the SCS.

Note that a time direction (t) shown in FIG. 3 may be referred to as a time domain, symbol period, symbol time, or the like. Further, a frequency direction may be referred to as a frequency domain, resource block, sub-carrier, Bandwidth part (BWP), or the like.

A DMRS is a type of reference signal and is prepared for various channels. In this case, unless otherwise specified, the DMRS may mean a DMRS for a downlink data channel, specifically, a DMRS for a Physical Downlink Shared Channel (PDSCH). However, a DMRS for an uplink data channel, specifically a DMRS for a Physical Uplink Shared Channel (PUSCH) may be interpreted in the same way as the DMRS for the PDSCH.

The DMRS may be used for channel estimation in the UE 200 as part of a device, for example, coherent demodulation. The DMRS may be present only in a resource block (RB) used for PDSCH transmission.

The DMRS may have a plurality of mapping types. Specifically, the DMRS has mapping type A and mapping type B. In the mapping type A, the first DMRS is allocated to a second or third symbol in a slot. In the mapping type A, the DMRS may be mapped based on a slot boundary regardless of where in the slot actual data transmission is initiated. It may be interpreted that the reason why the first DMRS is allocated to the second or third symbol in the slot is because the first DMRS after control resource sets (CORESET) is allocated.

In the mapping type B, the first DMRS may be allocated to a first symbol of data assignment. That is, a location of the DMRS may be given relative to a place where data is allocated, rather than relative to a slot boundary.

Further, the DMRS may have a plurality of Types. Specifically, the DMRS has Type 1 and Type 2. Type 1 and Type 2 differ in mapping and the maximum number of orthogonal reference signals in a frequency domain. In Type 1, it is possible to output a maximum of four orthogonal signals with a single-symbol DMRS, and in Type 2, it is possible to output a maximum of eight orthogonal signals with a double-symbol DMRS.

(2) Functional Block Configuration of Radio Communication System

Next, a functional block configuration of the radio communication system 10 will be described.

First, a functional block configuration of the UE 200 will be described.

Figure 4:
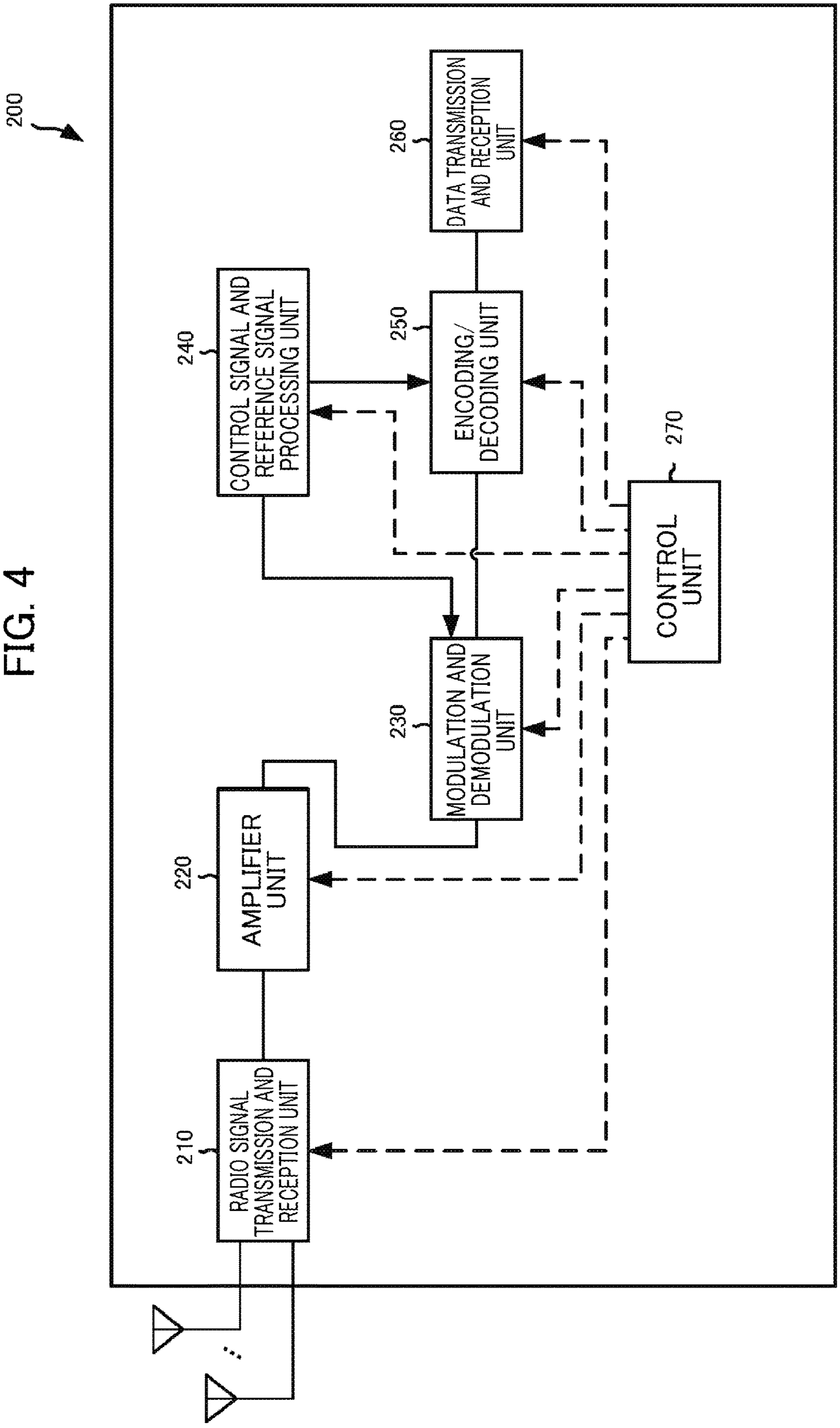
FIG. 4 is a functional block diagram of a UE 200.

FIG. 4 is a functional block diagram of the UE 200. As shown in FIG. 4, the UE 200 includes a radio signal transmission and reception unit 210, an amplifier unit 220, a modulation and demodulation unit 230, a control signal and reference signal processing unit 240, an encoding/decoding unit 250, a data transmission and reception unit 260, and a control unit 270.

The radio signal transmission and reception unit 210 transmits and receives radio signals compliant with NR. The radio signal transmission and reception unit 210 supports Massive MIMO, CA bundling and using a plurality of CCs, and DC communicating simultaneously between the UE and each of the two NG-RAN Nodes.

The amplifier unit 220 includes a Power Amplifier (PA)/Low Noise Amplifier (LNA) or the like. The amplifier unit 220 amplifies a signal output from the modulation and demodulation unit 230 to a predetermined power level. Further, the amplifier unit 220 amplifies an RF signal output from the radio signal transmission and reception unit 210.

The modulation and demodulation unit 230 performs data modulation/demodulation, transmission power configuration, resource block allocation, and the like for each predetermined communication destination (base station). In the modulation and demodulation unit 230, Cyclic Prefix-Orthogonal Frequency Division Multiplexing (CP-OFDM)/Discrete Fourier Transform-Spread (DFT-S-OFDM) may be applied. Further, the DFT-S-OFDM may be used not only for an uplink (UL) but also for a downlink (DL).

The control signal and reference signal processing unit 240 performs processing for various control signals transmitted and received by the UE 200 and processing for various reference signals transmitted and received by the UE 200.

Specifically, the control signal and reference signal processing unit 240 receives various control signals transmitted from the base station via a predetermined control channel, for example, control signals of a radio resource control layer (RRC). Further, the control signal and reference signal processing unit 240 transmits various control signals to the base station via a predetermined control channel.

Further, the control signal and reference signal processing unit 240 performs processing using Reference Signals (RSs) such as a Demodulation Reference Signal (DMRS), a Phase Tracking Reference Signal (PTRS).

A DMRS is a terminal-specific reference signal (a pilot signal) known between a base station and a terminal for estimating a fading channel used for data demodulation. The PTRS is a terminal-specific reference signal for a purpose of estimating phase noise, which becomes a problem in a high frequency band.

In addition to the DMRS and PTRS, the reference signals may include a Channel State Information-Reference Signal (CSI-RS), a Sounding Reference Signal (SRS), and a Positioning Reference Signal (PRS) for position information.

Further, the channel includes a control channel and a data channel. The control channel includes a Physical Downlink Control Channel (PDCCH), a Physical Uplink Control Channel (PUCCH), a Random Access Channel (RACH), Downlink control information (DCI) including a Random Access Radio Network Temporary Identifier (RA-RNTI), and a Physical Broadcast Channel (PBCH).

Further, the data channel includes a Physical Downlink Shared Channel (PDSCH), a Physical Uplink Shared Channel (PUSCH), and the like. The data means data transmitted via a data channel. The data channel may be read as a shared channel.

The control signal and reference signal processing unit 240 may receive downlink control information (DCI). The DCI includes, as existing fields, fields for storing DCI Formats, a Carrier indicator (CI), BWP indicator, Frequency Domain Resource Allocation (FDRA), Time Domain Resource Allocation (TDRA), Modulation and Coding Scheme (MCS), HARQ Process Number (HPN), New Data Indicator (NDI), Redundancy Version (RV), and the like.

A value stored in the DCI Format field is an information element that specifies a format of the DCI. A value stored in the CI field is an information element that specifies a CC to which the DCI is applied. A value stored in the BWP indicator field is an information element that specifies a BWP to which the DCI is applied. The BWP that can be specified using the BWP indicator is configured by an information element included in an RRC message (BandwidthPart-Config). A value stored in the FDRA field is an information element that specifies a frequency domain resource to which the DCI is applied. The frequency domain resource is identified by using the value stored in the FDRA field and the information element included in the RRC message (PA Type). A value stored in the TDRA field is an information element that specifies a time domain resource to which the DCI is applied. The time domain resource is identified by using the value stored in the TDRA field and the information element included in the RRC message (pdsch-TimeDomainAllocationList, pusch-TimeDomainAllocationList). The time domain resource may be identified by using the value stored in the TDRA field and a default table. A value stored in the MCS field is an information element that specifies an MCS to which the DCI is applied. The MCS is identified by using the value stored in the MCS and an MCS table. The MCS table may be specified by using the RRC message or identified by using RNTI scrambling. A value stored in the HPN field is an information element that specifies an HARQ Process to which the DCI is applied. A value stored in the NDI is an information element identifying whether the data to which the DCI is applied is initial transmission data. A value stored in the RV field is an information element that specifies redundancy of data to which the DCI is applied.

The encoding/decoding unit 250 performs data division/connection, channel coding/decoding, and the like for each predetermined communication destination (base station).

Specifically, the encoding/decoding unit 250 divides data output from the data transmission and reception unit 260 into predetermined sizes, and performs channel coding on the divided data. Further, the encoding/decoding unit 250 decodes data output from the modulation and demodulation unit 230 and connects the decoded data.

The data transmission and reception unit 260 transmits and receives a Protocol Data Unit (PDU) and a Service Data Unit (SDU). Specifically, the data transmission and reception unit 260 performs assembly/disassembly and the like of PDUs/SDUs in a plurality of layers (a medium access control layer (MAC), a radio link control layer (RLC), and a packet data convergence protocol layer (PDCP), and the like). Further, the data transmission and reception unit 260 performs data error correction and retransmission control based on a Hybrid Automatic Repeat Request (HARQ).

In an embodiment, the data transmission and reception unit 260 constitutes a receiving unit that receives data via a downlink channel in data distribution for a plurality of terminals. The data distribution for a plurality of terminals may be referred to as Multicast and Broadcast Services (MBS). The downlink channel may include a PDSCH (multicast) transmitted by means of multicast, and may include a PDSCH (unicast) transmitted by means of unicast. In the following, the PDSCH (multicast) and the PDSCH (unicast) are collectively referred to as a PDSCH (multicast/unicast). The reception of the PDSCH (multicast/unicast) may be read as the reception of data via the PDSCH (multicast/unicast).

The control unit 270 controls each functional block constituting the UE 200. In an embodiment, the control unit 270 constitutes a control unit that releases a resource of a secondary cell group (SCG) in response to deactivation of the SCG (hereinafter referred to as deactivation). The control unit 270 performs a random access procedure to the SCG (hereinafter referred to as RA procedure) in response to activation of the SCG (hereinafter referred to as activation).

The resource of the SCG may include a UL resource used for communication between the UE 200 and the SCG. The resource of the SCG may include a DL resource used for communication between the UE 200 and the SCG. The SCG activation may be referred to as re-activation of the SCG. A description will be given below by using a term SCG re-activation, but the SCG re-activation may be read as the SCG activation.

The SCG re-activation may include RACH-based SCG re-activation, and may include RACH less-based SCG re-activation. The RACH-based SCG re-activation is a method of performing the RA procedures to establish UL synchronization in the SCG re-activation. Meanwhile, the RACH less-based SCG re-activation is a method of skipping the RA procedure in the SCG re-activation when a synchronization condition is satisfied. The synchronization condition may include a condition in which a Time Alignment Timer (TAT) is not expired, may include a condition in which the UE 200 performs beam management on the SCG, may include a condition in which a beam failure is not detected, and may include a condition in which reconnection to an optimal beam is performed after a beam failure.

The control unit 270 may release a resource of the SCG in response to the SCG deactivation by considering that the TAT has expired. For example, when considering that the TAT has expired, the control unit 270 may notify the RRC of the release of the PUCCHs of all Serving Cell(s). When considering that the TAT has expired, the control unit 270 may notify the RRC of the release of the SRSs of all Serving Cell(s). When considering that the TAT has expired, the control unit 270 may clear configured DL assignment(s) and configured UL grant(s). When considering that the TAT has expired, the control unit 270 may clear the PUSCH used for semi-persistent CSI reporting. Instead of considering that the TAT has expired, the control unit 270 may force the TAT to expire.

Second, a functional block configuration of a base station 100 will be described. The base station 100 may be the eNB 100A or the gNB 100B.

Figure 5:
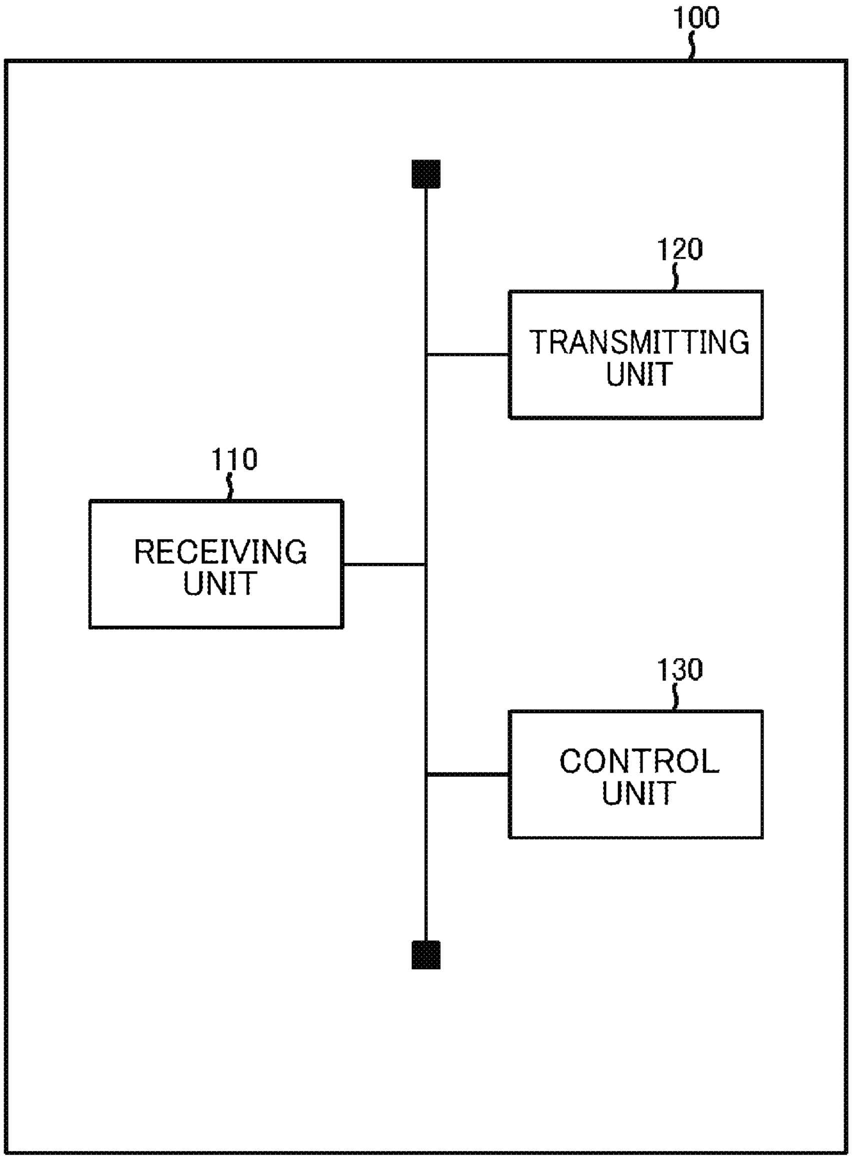
FIG. 5 is a functional block diagram of a base station 100.

FIG. 5 is a functional block diagram of the base station 100. As shown in FIG. 5, the base station 100 includes a receiving unit 110, a transmitting unit 120, and a control unit 130.

The receiving unit 110 receives various signals from the UE 200. The receiving unit 110 may receive a UL signal via the PUCCH or PUSCH.

The transmitting unit 120 transmits various signals to the UE 200. The transmitting unit 120 may transmit a DL signal via the PDCCH or PDSCH.

The control unit 130 controls the base station 100. In an embodiment, the control unit 130 may release a resource of the SCG in response to the SCG deactivation. That is, the control unit 130 may use for another UE 200 a resource of the UE 200 in which the SCG has been deactivated. The control unit 130 may assume that the TAT is considered to have expired in the UE 200 in response to the SCG deactivation. The control unit 130 may assume that the TAT is forcibly expired in the UE 200 in response to the SCG deactivation.

(3) Issue

As a result of intensive research, inventors and the like noticed that handling of the TAT has not been investigated in RACH-based SCG re-activation. If handling of the TAT similar to that of the RACH less-based SCG re-activation is assumed in the SCG deactivation, even though there is no communication of user data between the UE 200 and the SCG, the UL resources may be occupied by the UE 200 in which the SCG is deactivated, and there is a possibility that the efficiency of the use of UL resources is reduced. The handling of the TAT similar to that of the RACH less-based SCG re-activation is handling that maintains the TAT without expiration.

(4) Specific Conditions

To solve the issue described above, the UE 200 releases a resource of the SCG in response to the SCG deactivation. This operation may be referred to as a specific operation. The specific operation may be an operation in which the TAT is considered to have expired or an operation in which the TAT is forcibly expired. In such a case, the UE 200 may perform the specific operation if the specific condition is satisfied. As the specific condition, conditions described below may be considered.

First, the specific condition may be a condition that does not include any condition other than deactivation of the SCG (hereinafter referred to as a first specific condition). The first specific condition may be considered to be a condition under which the specific operation is performed regardless of whether RACH less-based SCG re-activation is supported. The first specific condition may be a condition under which the specific operation is always performed.

Second, the specific condition may be a condition for receiving a message including an information element in which RACH less-based SCG re-activation is not configured (hereinafter referred to as a second specific condition). RACH less-based SCG re-activation is an example of a procedure for re-activating an SCG group without using the RA procedure. For example, the second specific condition may be a condition under which the information element in which the RACH less-based SCG re-activation is configured is absent when RACH less-based SCG re-activation is supported and RACH less-based SCG re-activation is configurable. The message described above may be an RRC message. The RRC message may be RRC Connection Reconfiguration, RRC Reconfiguration, or a newly defined RRC message. Alternatively, the message described above may be a message instructing SCG deactivation or a message for performing configuration regarding SCG deactivation. The message described above may be an MAC CE message.

Third, the specific condition may be a condition for receiving a message including an information element requesting release of a resource of the SCG (hereinafter referred to as a third specific condition). For example, the information element may be an information element in which the TAT is considered to have expired in response to the SCG deactivation, or may be an information element in which the TAT is forcibly expired in response to the SCG deactivation. The message described above may be an RRC message. The RRC message may be RRC Connection Reconfiguration, RRC Reconfiguration, or a newly defined RRC message. Alternatively, the message described above may be a message instructing the SCG deactivation or a message for performing configuration regarding the SCG deactivation. The above message may be a MAC CE message.

Fourth, the specific condition may be a condition determined by the UE 200 (hereinafter referred to as a fourth specific condition). The fourth specific condition may be a condition configured in advance for the UE 200. When the UE 200 performs a specific operation, the UE 200 may transmit, to the network, a message including an information element indicating that the specific operation is to be performed. The message may be SCG failure information or a newly defined RRC message. In such a case, the base station 100 may assume that the UE 200 will not perform the specific operation if no message is received, and may assume that the UE 200 will perform the specific operation if a message is received.

Alternatively, when the UE 200 does not perform the specific operation, the UE 200 may transmit, to the network, a message including an information element indicating that the specific operation will not be performed. In such a case, the base station 100 may assume that the UE 200 will perform the specific operation if no message is received, and may assume that the UE 200 will not perform the specific operation if a message is received.

(5) Operation of Radio Communication System

Figure 6:
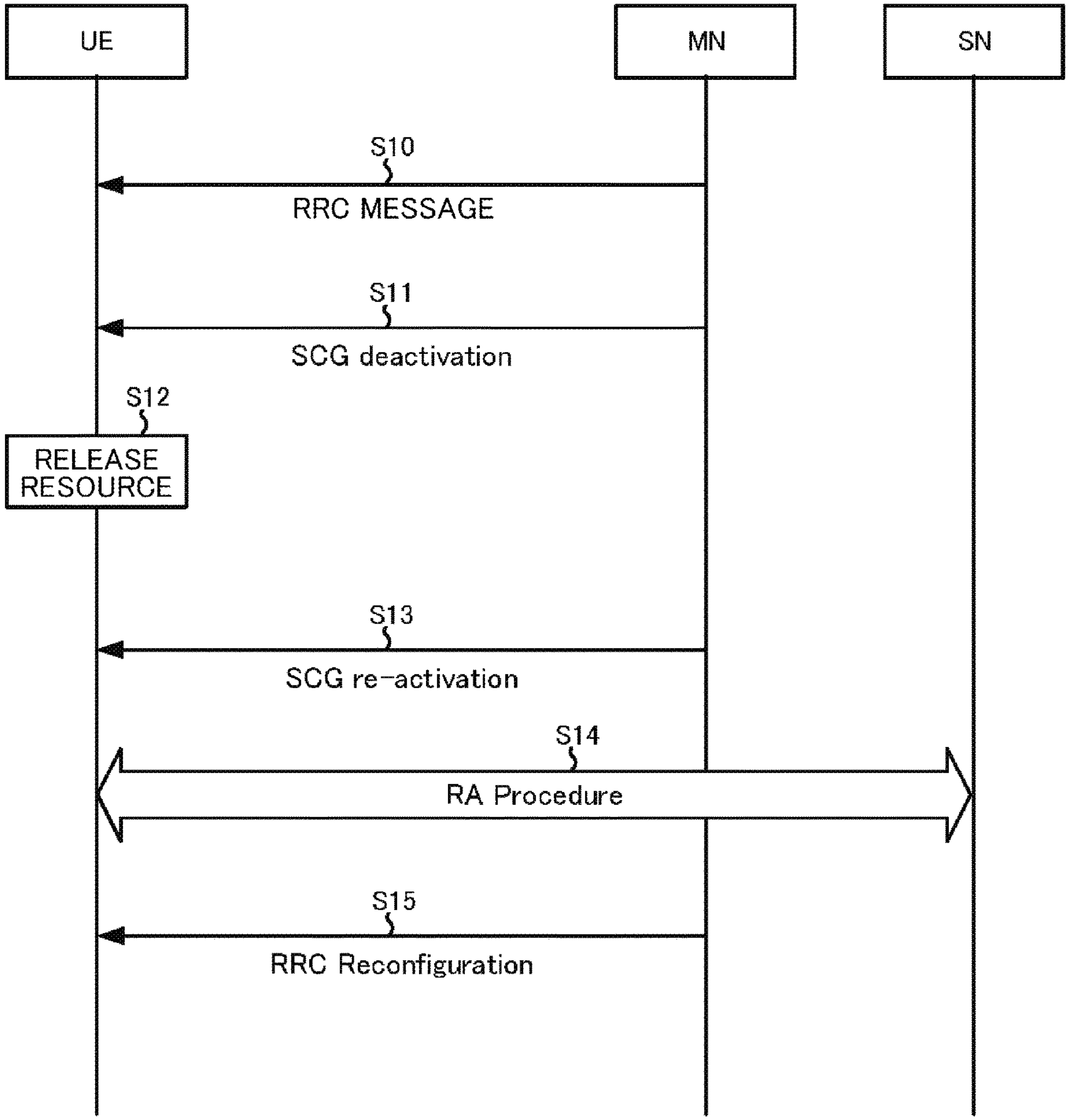
FIG. 6 is a diagram showing an operation of the radio communication system 10.

Next, an operation of the radio communication system 10 will be described. In FIG. 6, signaling between the MN and the SN is omitted.

As shown in FIG. 6, in step 510, the UE receives an RRC message from the MN. The RRC message may include an information element indicating whether to configure RACH less-based SCG re-activation. The RRC message may include an information element requesting release of a resource of the SCG.

In step S11, the UE receives the SCG deactivation from the MN. The SCG deactivation may include an information element indicating whether to configure RACH less-based SCG re-activation. The SCG deactivation may include an information element requesting release of the resource of the SCG.

In step S12, the UE performs the SCG deactivation. Here, a case where the specific operation described above is performed is exemplified, and the UE releases a resource related to the SCG in response to the SCG deactivation. The UE may consider that the TAT has expired, or may force the TAT to expire.

In step S13, the UE receives the SCG re-activation from the MN.

In step S14, the UE performs the RA procedure with the SN. The RA procedure may be a 2-step RA procedure or a 4-step RA procedure.

In step S15, the UE receives the RRC Reconfiguration from the MN. It should be noted that the RRC Reconfiguration is a different message from reconfigurationWithSync (see 3GPP TS38.331, chapter 5.3.5.5.2 and the like).

(6) Action and Effect

In an embodiment, the UE 200 releases a resource of the SCG in response to the SCG deactivation. According to this configuration, when RACH-based SCG re-activation is assumed, it is possible to avoid a situation in which UL resources are occupied by the UE 200 in which the SCG is deactivated, and it is possible to suppress reduction in the efficiency of the use of the UL resource.

In an embodiment, by the UE 200 releasing the UL resource, the RRC Reconfiguration is uniformly applied after the SCG re-activation, regardless of whether reconfiguring of a Transmission Configuration Indicator (TCI) and an SRS Resource Indicator (SRI) is necessary. According to this configuration, in an operation scenario in which reconfiguring of the TCI and SRI is expected when the SCG re-activation is performed, there is no advantage in that the RRC Reconfiguration can be omitted in a case where reconfiguring of the TCI and SRI is not required, and an advantage that can suppress reduction in the efficiency of the use of the UL resource is considered to be greater.

(7) Other Embodiments

Although contents of the present invention have been described in accordance with the embodiment, the present invention is not limited to the descriptions, and it is obvious to those skilled in the art that various modifications and improvements are possible.

In the above disclosure, the UE 200 releases a resource of the SCG in the SCG deactivation, which may include at least any of states described below.

- A PUSCH is not transmitted in a deactivated SCG.
- A PDCCH is not monitored in the PSCell in a deactivated SCG.
- SCell dormancy is not supported for a SCell in a deactivated SCG.
- UE 200 maintains a synchronization state in the DL.
- UE 200 performs measurement regarding restricted radio resource management (Restricted RRM measurement).
- Mobility of the PSCell is supported.
- UE 200 performs restricted radio link monitoring (RLM).
- UE 200 does not perform beam management (beam failure detection and recovery), a Sounding Reference Signal (SRS) transmission, or CSI report.

Although not specifically mentioned in the above disclosure, the SCG deactivation may be performed by means of a NW trigger (for example, an MN trigger or SN trigger) or by means of a UE trigger. Similarly, the SCG re-activation may be performed by means of a NW trigger (for example, an MN trigger or SN trigger) or by means of a UE trigger.

Although not specifically mentioned in the above disclosure, a specific operation in which the TAT is considered to have expired (or, a specific operation in which the TAT is forcibly expired) may be applied to a primary Timing Advance Group (pTAG), to a secondary Timing Advance Group (sTAG), or to both the pTAG and sTAG.

The block diagram (FIGS. 4 and 5) used in the description of the above-described embodiment shows blocks in units of functions. Those functional blocks (components) can be realized by a desired combination of at least one of hardware and software. A realization method for each functional block is not particularly limited. That is, each functional block may be realized by using one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that makes a transmitting function work is called a transmitting unit or a transmitter. For any of the above, as described above, the realization method is not particularly limited.

Figure 7:
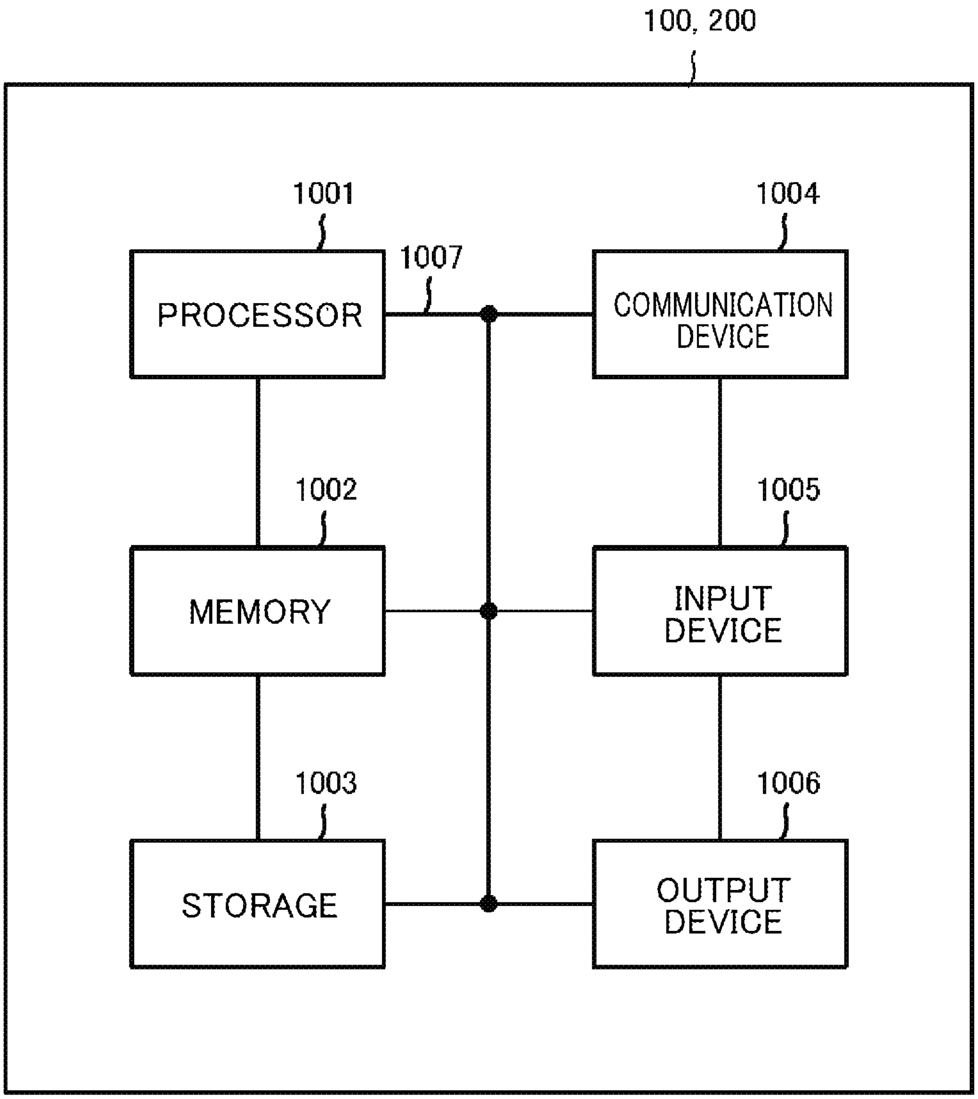
FIG. 7 is a diagram showing an example of the hardware configuration of the base station 100 and the UE 200.

Further, the above-described base station 100 and UE 200 (the device) may function as a computer that performs processing of a radio communication method of the present disclosure. FIG. 7 is a diagram showing an example of a hardware configuration of the device. As shown in FIG. 7, the device may be configured as a computer device including a processor 1001, a memory 1002, a storage 1003, a communication device 1004, an input device 1005, an output device 1006, a bus 1007, and the like.

Furthermore, in the following description, the term "device" can be substituted with circuit, device, unit, or the like. The hardware configuration of the device may include one or more devices shown in the figure or may not include some of the devices.

Each of the functional blocks of the device (see FIG. 4) is implemented by means of any of hardware elements of the computer device or a combination of the hardware elements.

In addition, each function in the device is realized by loading predetermined software (programs) on hardware such as the processor 1001 and the memory 1002 so that the processor 1001 performs arithmetic operations to control communication via the communication device 1004 and to control at least one of reading and writing of data on the memory 1002 and the storage 1003.

The processor 1001 operates, for example, an operating system to control the entire computer. The processor 1001 may be configured with a Central Processing Unit (CPU) including interfaces with peripheral devices, control devices, arithmetic devices, registers, and the like.

Moreover, the processor 1001 reads a program (program code), a software module, data, and the like from at least one of the storage 1003 and the communication device 1004 into the memory 1002, and executes various processes according to these. As the program, a program causing the computer to execute at least part of the operation described in the above embodiment is used. Alternatively, various processes described above can be executed by one processor 1001 or can be executed simultaneously or sequentially by two or more processors 1001. The processor 1001 can be implemented by using one or more chips. Alternatively, the program may be transmitted from a network via a telecommunication line.

The memory 1002 is a computer readable recording medium and may be configured, for example, with at least one of a Read Only Memory (ROM), Erasable Programmable ROM (EPROM), Electrically Erasable Programmable ROM (EEPROM), Random Access Memory (UM), and the like. The memory 1002 may be referred to as a register, cache, main memory (main storage device), and the like. The memory 1002 may store therein programs (program codes), software modules, and the like that can execute the method according to one embodiment of the present disclosure.

The storage 1003 is a computer readable recording medium. Examples of the storage 1003 include at least one of an optical disk such as Compact Disc ROM (CD-ROM), a hard disk drive, a flexible disk, a magneto-optical disk (for example, a compact disk, a digital versatile disk, Blu-ray (registered trademark) disk), a smart card, a flash memory (for example, a card, a stick, a key drive), a floppy (registered trademark) disk, a magnetic strip, and the like. The storage 1003 can be referred to as an auxiliary storage device. The recording medium can be, for example, a database including at least one of the memory 1002 and the storage 1003, a server, or other appropriate medium.

The communication device 1004 is hardware (transmission/reception device) capable of performing communication between computers via at least one of a wired network and a wireless network. The communication device 1004 is also referred to as, for example, a network device, a network controller, a network card, a communication module, and the like.

The communication device 1004 may include a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may have an integrated configuration (for example, a touch screen).

Also, the respective devices such as the processor 1001 and the memory 1002 are connected to each other with the bus 1007 for communicating information. The bus 1007 may be constituted by a single bus or may be constituted by different buses for each device-to-device.

Further, the device may be configured to include hardware such as a microprocessor, a Digital Signal Processor (DSP), an Application Specific Integrated Circuit (ASIC), a Programmable Logic Device (PLD), and a Field Programmable Gate Array (FPGA). Some or all of these functional blocks may be realized by means of this hardware. For example, the processor 1001 may be implemented by using at least one of the above-described items of hardware.

Further, notification of information is not limited to that in the aspect/embodiment described in the present disclosure, and may be performed by using other methods. For example, notification of information may be performed by physical layer signaling (for example, Downlink Control Information (DCI), Uplink Control Information (UCI)), higher layer signaling (for example, RRC signaling, Medium Access Control (MAC) signaling), broadcast information (Master Information Block (MIB), System Information Block (SIB)), other signals, or a combination thereof. The RRC signaling may also be referred to as an RRC message, for example, or may be an RRC Connection Setup message, an RRC Connection Reconfiguration message, or the like.

Each aspect/embodiment described in the present disclosure can be applied to at least one of Long Term Evolution (LTE), LTE-Advanced (LTE-A), SUPER 3G, IMT-Advanced, the 4th generation mobile communication system (4G), the 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), a system using any other appropriate system, and a next-generation system that is expanded based on these. Further, a plurality of systems may be combined (for example, a combination of at least one of LTE and LTE-A with 5G) and applied.

The order of the processing procedures, sequences, flowcharts, and the like of each aspect/embodiment described in the present disclosure may be exchanged as long as there is no contradiction. For example, the methods described in the present disclosure present the elements of the various steps by using an exemplary order and are not limited to the presented specific order.

The specific operation that is performed by a base station in the present disclosure may be performed by its upper node in some cases. In a network constituted by one or more network nodes having a base station, it is obvious that the various operations performed for communication with the terminal may be performed by at least one of the base station and other network nodes other than the base station (for example, an MME, an S-GW, and the like may be considered, but there is not limited thereto). In the above, an example in which there is one network node other than the base station is explained; however, a combination of a plurality of other network nodes (for example, an MME and an S-GW) may be used.

Information and signals (information and the like) can be output from a higher layer (or lower layer) to a lower layer (or higher layer). These may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by using a value (0 or 1) represented by one bit, by truth-value (Boolean: true or false), or by comparison of numerical values (for example, comparison with a predetermined value).

Each of the aspects/embodiment described in the present disclosure may be used separately or in combination, or may be switched in accordance with the execution. In addition, notification of predetermined information (for example, notification of “is X”) is not limited to being performed explicitly, and it may be performed implicitly (for example, without notifying the predetermined information).

Regardless of being referred to as software, firmware, middleware, microcode, hardware description language, or some other name, software should be interpreted broadly to mean instructions, an instruction set, code, a code segment, program code, a program, a subprogram, a software module, an application, a software application, a software package, a routine, a subroutine, an object, an executable file, an execution thread, a procedure, a function, and the like.

Further, software, instruction, information, and the like may be transmitted and received via a transmission medium. For example, when software is transmitted from a website, a server, or another remote source by using at least one of a wired technology (a coaxial cable, an optical fiber cable, a twisted pair cable, a Digital Subscriber Line (DSL), or the like) and a wireless technology (infrared light, microwave, or the like), then at least one of these wired and wireless technologies is included within the definition of the transmission medium.

Information, signals, or the like described in the present invention may be represented by using any of a variety of different technologies. For example, data, an instruction, a command, information, a signal, a bit, a symbol, a chip, or the like that may be mentioned throughout the above description may be represented by a voltage, a current, an electromagnetic wave, a magnetic field or magnetic particles, an optical field or photons, or a desired combination thereof.

It should be noted that the terms described in the present disclosure and terms necessary for understanding the present disclosure may be replaced with terms having the same or similar meanings. For example, at least one of a channel and a symbol may be a signal (signaling). A signal may also be a message. Further, a Component Carrier (CC) may be referred to as a carrier frequency, a cell, a frequency carrier, or the like.

The terms “system” and “network” used in the present disclosure can be used interchangeably.

Furthermore, information, parameters, and the like described in the present disclosure can be represented by an absolute value, can be represented by a relative value from a predetermined value, or can be represented by corresponding other information. For example, a radio resource can be indicated using an index.

Names used for the above parameters are not restrictive names in any respect. In addition, formulas and the like using these parameters may be different from those explicitly disclosed in the present disclosure. Since the various channels (for example, a PUCCH, a PDCCH, or the like) and information elements can be identified by any suitable names, the various names allocated to these various channels and information elements shall not be restricted in any way.

In the present disclosure, the terms such as “base station (Base Station: BS)”, “radio base station”, “fixed station”, “NodeB”, “eNodeB (eNB)”, “gNodeB (gNB)”, “access point”, “transmission point”, “reception point”, “transmission/reception point”, “cell”, “sector”, “cell group”, “carrier”, “component carrier”, and the like can be used interchangeably. A base station may also be referred to with a term such as a macro cell, a small cell, a femtocell, or a pico cell.

A base station can accommodate one or more (for example, three) cells (also referred to as sectors). In a configuration in which a base station accommodates a plurality of cells, the entire coverage area of the base station can be divided into a plurality of smaller areas. In each of the smaller areas, a communication service can be provided by a base station subsystem (for example, a small base station for indoor use (remote radio head: RRH)).

The term “cell” or “sector” refers to a part or all of the coverage area of at least one of a base station and a base station subsystem that performs a communication service in this coverage.

In the present disclosure, the terms such as “mobile station (Mobile Station: MS)”, “user terminal”, “user equipment (User Equipment: UE)”, and “terminal” can be used interchangeably.

A mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms by those skilled in the art.

At least one of a base station and a mobile station may be called a transmitting device, a receiving device, a communication device, or the like. Note that at least one of a base station and a mobile station may be a device mounted on a moving body, a moving body itself, or the like. The moving body may be a vehicle (for example, a car, an airplane, or the like), an unmanned moving body (a drone, a self-driving car, or the like), or a robot (manned type or unmanned type). At least one of a base station and a mobile station also includes a device that does not necessarily move during the communication operation. For example, at least one of a base station and a mobile station may be an Internet of Things (IoT) device such as a sensor.

Also, a base station in the present disclosure may be substituted with a mobile station (user terminal, hereinafter the same). For example, each aspect/embodiment of the present disclosure may be applied to a configuration in which communication between a base station and a mobile station is replaced with communication between a plurality of mobile stations (for example, this may be called Device-to-Device (D2D), Vehicle-to-Everything (V2X), or the like). In this case, the mobile station may have the function of a base station. In addition, words such as "uplink" and "downlink" may also be substituted with words corresponding to inter-terminal communication (for example, "side"). For example, an uplink channel, a downlink channel, or the like may be substituted with a side channel.

Similarly, the mobile station in the present disclosure may be read as a base station. In this case, the base station may have the function of the mobile station.

A radio frame may be composed of one or more frames in the time domain. Each of the one or more frames in the time domain may be referred to as a subframe.

A subframe may be further composed of one or more slots in the time domain. The subframe may be a fixed time length (for example, 1 ms) independent of the numerology.

The numerology may be a communication parameter applied to at least one of transmission and reception of a certain signal or channel. The numerology may indicate at least one of, for example, subcarrier spacing (SCS), bandwidth, symbol length, cyclic prefix length, transmission time interval (TTI), the number of symbols per TTI, radio frame configuration, a specific filtering process performed by a transceiver in the frequency domain, a specific windowing process performed by a transceiver in the time domain, and the like.

A slot may be composed of one or more symbols (Orthogonal Frequency Division Multiplexing (OFDM)) symbols, Single Carrier Frequency Division Multiple Access (SC-FDMA) symbols, and the like) in the time domain. A slot may be a unit of time based on the numerology.

A slot may include a plurality of minislots. Each minislot may be composed of one or more symbols in the time domain. A minislot may be called a subslot. A minislot may be composed of fewer symbols than slots. A PDSCH (or PUSCH) transmitted in time units greater than the minislot may be referred to as a PDSCH (or PUSCH) mapping type A. A PDSCH (or PUSCH) transmitted using a minislot may be referred to as a PDSCH (or PUSCH) mapping type B.

Each of a radio frame, subframe, slot, minislot, and symbol represents a time unit for transmitting a signal. A radio frame, subframe, slot, minislot, and symbol may have respectively different names corresponding to them.

For example, one subframe may be called a transmission time interval (TTI), a plurality of consecutive subframes may be called a TTI, and one slot or one minislot may be called a TTI. That is, at least one of the subframe and TTI may be a subframe (1 ms) in the existing LTE, a period shorter than 1 ms (for example, 1-13 symbols), or a period longer than 1 ms. Note that, a unit representing TTI may be called a slot, a minislot, or the like instead of a subframe.

Here, a TTI refers to the minimum time unit of scheduling in radio communication, for example. For example, in the LTE system, the base station performs scheduling for allocating radio resources (frequency bandwidth, transmission power, and the like that can be used in each user terminal) to each user terminal in units of TTI. The definition of TTI is not limited to this.

A TTI may be a transmission time unit such as a channel-encoded data packet (transport block), a code block, or a code word, or may be a processing unit such as scheduling or link adaptation. When a TTI is given, a time interval (for example, the number of symbols) in which a transport block, a code block, a code word, and the like are actually mapped may be shorter than TTI.

When one slot or one minislot is called a TTI, one or more TTIs (that is, one or more slots or one or more minislots) may be the minimum time unit of the scheduling. The number of slots (minislot number) constituting the minimum time unit of the scheduling may be controlled.

A TTI having a time length of 1 ms may be referred to as an ordinary TTI (TTI in LTE Rel. 8-12), a normal TTI, a long TTI, an ordinary subframe, a normal subframe, a long subframe, a slot, and the like. A TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, and the like) may be read as a TTI having a time length exceeding 1 ms, and a short TTI (for example, shortened TTI) may be read as a TTI having a TTI length of less than a TTI length of a long TTI and a TTI length of 1 ms or more.

A resource block (RB) is a resource allocation unit in the time domain and the frequency domain, and may include one or more consecutive subcarriers in the frequency domain. The number of subcarriers included in the RB may be the same regardless of the numerology, and may be 12, for example. The number of subcarriers included in the RB may be determined based on the numerology.

Further, the time domain of an RB may include one or more symbols, and may have a length of 1 slot, 1 minislot, 1 subframe, or 1 TTI. Each TTI, subframe, or the like may be composed of one or more resource blocks.

Note that, one or more RBs may be called a physical resource block (PRB), a sub-carrier group (SCG), a resource element group (REG), a PRB pair, a RB pair, and the like.

A resource block may be configured by one or more resource elements (REs). For example, one RE may be a radio resource domain of one subcarrier and one symbol.

A bandwidth part (BWP) (which may be called a partial bandwidth or the like) may represent a subset of consecutive common resource blocks (RBs) for a certain numerology in a certain carrier. Here, the common RB may be specified by an index of the RB based on the common reference point of the carrier. A PRB may be defined in a certain BWP and numbered within that BWP.

A BWP may include a BWP for UL (UL BWP) and a BWP for DL (DL BWP). One or more BWPs may be set in one carrier for the UE.

At least one of the configured BWPs may be active, and the UE does not have to expect to transmit and receive predetermined signals/channels outside the active BWP. Note that "cell", "carrier", and the like in this disclosure may be read as "BWP".

The above-described structures such as a radio frame, a subframe, a slot, a minislot, and a symbol are merely examples. For example, structures such as the number of subframes included in a radio frame, the number of slots per subframe or radio frame, the number of minislots included in a slot, the number of symbols and RBs included in a slot or minislot, the number of subcarriers included in RBs, and the number of symbols included in a TTI, a symbol length, the cyclic prefix (CP) length, and the like can be changed in various manner.

The terms "connected", "coupled", or any variations thereof mean any direct or indirect connection or coupling between two or more elements, and can include that one or more intermediate elements are present between two elements that are "connected" or "coupled" to each other. The coupling or connection between the elements may be physical, logical, or a combination thereof. For example, "connection" may be substituted with "access". In the present disclosure, two elements can be "connected" or "coupled" to each other by using at least one of one or more wires, one or more cables, and one or more printed electrical connections, and as some non-limiting and non-exhaustive examples, by using electromagnetic energy having wavelengths in the radio frequency domain, a microwave region, and a light (both visible and invisible) region, and the like.

A reference signal may be abbreviated as RS and may be called a pilot according to applicable standards.

As used in the present disclosure, the phrase "based on" does not mean "based only on" unless explicitly stated otherwise. In other words, the phrase "based on" means both "based only on" and "based at least on".

"Means" in the configuration of each device above may be replaced with "unit", "circuit", "device", and the like.

Any reference to elements using a designation such as "first", "second", or the like used in the present disclosure generally does not limit the amount or order of those elements. Such designations can be used in the present disclosure as a convenient method to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive-OR.

Throughout the present disclosure, for example, during translation, if articles such as a, an, and the in English are added, the present disclosure may include that a noun following these articles is used in plural.

As used in this disclosure, the term "determining" may encompass a wide variety of actions. "determining" includes deeming that determining has been performed by, for example, judging, calculating, computing, processing, deriving, investigating, searching (looking up, search, inquiry) (for example, searching in a table, database, or another data structure), ascertaining, and the like. In addition, "determining" can include deeming that determining has been performed by receiving (for example, receiving information), transmitting (for example, transmitting information), inputting (input), outputting (output), access (accessing) (for example, accessing data in a memory), and the like. In addition, "determining" can include deeming that determining has been performed by resolving, selecting, choosing, establishing, comparing, and the like. That is, "determining" may include deeming that "determining" regarding some action has been performed. Moreover, "determining" may be read as "assuming", "expecting", "considering", and the like.

In the present disclosure, the wording "A and B are different" may mean "A and B are different from each other". It should be noted that the wording may mean "A and B are each different from C". Terms such as "separate", "couple", or the like may also be interpreted in the same manner as "different".

Although the present disclosure has been described in detail above, it will be obvious to those skilled in the art that the present disclosure is not limited to the embodiments described in the present disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Radio communication system
20 E-UTRAN
30 NG-RAN
40 Core network
100A eNB
100B gNB
100 Base station
110 Receiving unit
120 Transmitting unit
130 Control unit
200 UE
210 Radio signal transmission and reception unit
220 Amplifier unit
230 Modulation and demodulation unit
240 Control signal and reference signal processing unit
250 Encoding/decoding unit
260 Data transmission and reception unit
270 Control unit
1001 Processor
1002 Memory
1003 Storage
1004 Communication device
1005 Input device
1006 Output device
1007 Bus

The invention claimed is:

1. A terminal comprising:

a receiver that receives an indication of deactivation of a secondary cell group; and a processor that considers a Time Alignment Timer (TAT) as expired and releases a resource of the secondary cell group, in response to the indication.

2. The terminal according to claim 1, wherein the processor notifies a radio resource control layer of release of an uplink control channel of all serving cells when considering the TAT as expired.

3. The terminal according to claim 1, wherein the processor notifies a radio resource control layer of release of a Sounding Reference Signal of all serving cells when considering the TAT as expired.

4. The terminal according to claim 1, wherein the processor clears configured DL assignments and configured UL grants when considering the TAT as expired.

5. The terminal according to claim 1, wherein the processor clears an uplink shared channel for semi-persistent Channel State Information reporting when considering the TAT as expired.

6. A radio communication system comprising: a base station; and a terminal, wherein the base station includes a transmitter that transmits an indication of deactivation of a secondary cell group, the terminal includes:

a receiver that receives the indication, and a processor that considers a Time Alignment Timer (TAT) as expired and releases a resource of the secondary cell group, in response to the indication.

7. A radio communication method performed by a terminal, comprising:

receiving an indication of deactivation of a secondary cell group; and considering a Time Alignment Timer (TAT) as expired and releasing a resource of the secondary cell group, in response to the indication.

* * * * *